United States Patent [19]

Hug et al.

[11] Patent Number: 5,558,884
[45] Date of Patent: *Sep. 24, 1996

[54] SYSTEM FOR RAPIDLY PRODUCING EITHER INTEGRATED CIRCUITS ON A SUBSTRATE, INTERCONNECTIONS ON A PRINTED CIRCUIT BOARD OR RAPIDLY PERFORMING LITHOGRAPHY

[75] Inventors: William F. Hug, Chino; Ray D. Reid, Glendora, both of Calif.

[73] Assignee: Omnichrome Corporation, Chino, Calif.

[ * ] Notice: The term of this patent shall not extend beyond the expiration date of Pat. No. 5,026,146.

[21] Appl. No.: 412,608

[22] Filed: Mar. 29, 1995

Related U.S. Application Data

[63] Continuation of Ser. No. 141,861, Oct. 21, 1993, abandoned, which is a continuation of Ser. No. 722,482, Jun. 25, 1991, abandoned, which is a continuation-in-part of Ser. No. 367,741, Jun. 16, 1989, Pat. No. 5,026,146, which is a continuation-in-part of Ser. No. 333,385, Apr. 3, 1989, abandoned.

[51] Int. Cl.$^6$ .................................................... B29C 35/08
[52] U.S. Cl. .................... 425/174.4; 264/272.17; 264/494; 346/77 R; 353/99; 365/126
[58] Field of Search .................. 425/174.4; 264/308, 264/272.17, 401, 494; 346/77 R; 353/99; 365/111, 119, 108, 126

[56] References Cited

U.S. PATENT DOCUMENTS

| | | | |
|---|---|---|---|
| 3,609,706 | 9/1971 | Adamson | 365/119 |
| 3,609,707 | 9/1971 | Lewis et al. | 365/119 |
| 4,023,969 | 5/1977 | Sheridon | 346/77 R X |
| 4,041,476 | 8/1977 | Swainson | 365/119 |
| 4,078,229 | 3/1978 | Swanson et al. | 365/111 |
| 4,111,538 | 9/1978 | Sheridon | 353/99 |
| 4,238,840 | 12/1980 | Swainson | 365/119 |
| 4,333,165 | 6/1982 | Swainson et al. | 365/119 |
| 4,435,445 | 3/1984 | Allred et al. | 427/583 |
| 4,575,330 | 3/1986 | Hull | 425/174.4 |
| 4,595,647 | 6/1986 | Spanjer | 264/272.17 X |
| 4,848,879 | 7/1989 | Nishimura et al. | 359/259 |
| 4,854,677 | 8/1989 | O'Meara | 359/242 |
| 4,970,196 | 11/1990 | Kim et al. | 427/422 X |
| 4,983,252 | 1/1991 | Masui et al. | 427/96 |
| 5,026,146 | 6/1991 | Hug et al. | 365/126 X |
| 5,026,664 | 6/1991 | Hongo et al. | 148/DIG. 93 |
| 5,052,102 | 10/1991 | Fong et al. | 29/840 |

*Primary Examiner*—Richard L. Chiesa
*Attorney, Agent, or Firm*—William H. Wright

[57] ABSTRACT

A system for rapidly producing an integrated circuit on a substrate using a curable liquid capable of solidification to form a photo-resist pattern corresponding to an artwork representation of interconnections when subjected to ultra-violet light energy operates with a processor and computer aided design software. The system includes an x-y table, an electronically erasable mask, a drawing device and a projecting system. The substrate is disposed on the x-y table. The curable liquid lies in a solidification plane on the substrate. The electronically erasable mask is an ultra-violet wavelength isolating image buffer and is electrically coupled to the processor. The drawing device may be a back lighted liquid crystal display or a high resolution cathode ray tube or an infrared diode laser raster scanner and electronically draws an image of the artwork representation for the interconnections onto the electronically erasable mask. The projecting system projects ultra-violet light energy onto the electronically erasable mask so that the electronically erasable mask transfers a single frame exposure of the image in order to reflect the ultra-violet light energy onto the curable liquid in the solidification plane thereby forming the photo-resist pattern on the substrate.

15 Claims, 4 Drawing Sheets

SYSTEM FOR RAPIDLY PRODUCING EITHER INTEGRATED CIRCUITS ON A SUBSTRATE, INTERCONNECTIONS ON A PRINTED CIRCUIT BOARD OR RAPIDLY PERFORMING LITHOGRAPHY

This is a continuation of application Ser. No. 08/141,861 filed Oct. 21, 1993, now abandoned, is a continuation of the application filed Jun. 25, 1991 under Ser. No. 07/722,482, now abandoned, which application is a continuation-in-part of an application filed on Jun. 16, 1989 under Ser. No. 367,741, now U.S. Pat. No. 5,026,146, which is a continuation-in-part of an application filed on Apr. 3, 1989 under Ser. No. 333,385, now abandoned.

BACKGROUND OF THE INVENTION

1. Field of the Invention

This invention relates to a system for rapidly producing either an integrated circuit on a substrate or interconnections on a printed circuit board using a curable liquid which is capable of solidification to form a photo-resist pattern when subjected to ultra-violet light energy and more particularly to an erasable mask for reflecting ultra-violet light energy onto the curable liquid by a single frame exposure rather than by either a point-by-point exposure or a line-by-line exposure,

2. Description of the Prior Art

U.S. Pat. No 4,835 704 entitled Adaptive Lithography System to Provide High Density Interconnect, issued to Charles W. Eichelberger, Robert J. Wojnarowski and Kenneth B. Welles, II on May 30, 1989, teaches a procedure which provides high density interconnections of very large scale integrated circuits on a substrate. The procedure is performed in four basic steps: first an artwork representation for the interconnections of the integrated circuits is generated. This artwork representation is stored in a computer data base and assumes the integrated circuits to be at predetermined ideal locations and positions on the substrate. Second, using imaging, the actual positions of each integrated circuit on the substrate are determined. The actual positions of the integrated circuits are compared with their deal positions to compute an offset and rotation for each integrated circuit on the substrate. Third, the computed offsets and rotations are then used to modify the artwork representation stored in the data base to account for the actual locations and positions of the integrated circuits on the substrate. Finally, the modified artwork representation is used to drive a direct writing laser lithography system that actually forms the high density interconnections of the integrated circuits on the substrate. The artwork representations are stored in computer data bases in vector form to minimize storage requirements. The laser beam produced by the lithography system is raster scanned on the substrate. Modulation of the laser beam is controlled by the real time conversion of the vector representation of the modified artwork to be a bit mapped representation. To assure accurate formations of the interconnects, a feedback alignment system is used to accurately position the laser beam throughout its raster scan.

U.S. Pat. No. 4,888,450, entitled Circuit Board Fabrication Leading to Increased Capacity, issued to David J. Lando and Frederick R., Wight, Jr. on Dec. 19, 1989, teaches printed circuit boards which have a plurality of circuit layers are produced using a specific processing sequence. A copper-clad substrate is first patterned in a desired configuration to produce the first layer of the printed circuit board. The patterned metallization is then covered with a specifically formulated energy sensitive material. The energy sensitive material is delineated in a desired pattern and developed to uncover portions of the underlying metallization pattern. The entire substrate is blanket-cured to produce a rigid layer having openings in appropriate places. The openings are metallized and a second copper pattern is produced on the cured polymer by conventional metallization and lithographic techniques. If desired, the process is repeated until a suitable number of copper patterned levels are obtained.

U.S. Pat. No. 4,910,679, entitled Step-and-Repeat Alignment and Exposure Method and Apparatus, issued to Kazuo Takahashi and Masao Kosugi on Mar. 20, 1990, teaches an exposure apparatus which is usable in the manufacture of semiconductor devices, for transferring a pattern of a reticle onto each of discrete areas of a semiconductor wafer in a step-and-repeat manner. The apparatus has a laser interferometer for precisely measuring the amount of displacement of the wafer and a memory for storing positional errors of the shot areas, relative to respective target positions, established at the time of completion of the step-wise movements of the wafer. In accordance with the stored positional errors and with the result of measurement by the laser interferometer, the amount of step-wise movement of the wafer is corrected, whereby the accuracy of step-feed for the wafer is improved without decreasing the throughput.

U.S. Pat. No. 4,898,804, Self-aligned, High Resolution Resonant Dielectric Lithography, issued to Kurt Rauschenbach and Charles A. Lee on Feb. 6, 1990, teaches methods of fabricating electrical contacts on both sides of a thin membrane to form a millimeter wave, self-aligned, opposed gate-source transistor are disclosed. The transistor structure has a subhalf-micron gate, dual-drains placed symmetrically around both sides of the gate, and a source approximately half the length of the gate. The source is directly opposite, and centered under, the gate on the opposite surface of a semiconductor thin film. The gate electrode is fabricated on the first surface of the thin film using conventional single surface lithography, and is used as a conformed mask for the source lithography, thereby self-aligning the source to the gate. The source is formed by resonant dielectric lithography, wherein the gate side of the thin film is irradiated by collimated ultraviolet light to expose a negative resist on the source side with a resolution of less than a wavelength. Lateral diffraction effects affect the relative dimension of the source with respect to the gate. The electron-beam lithographic process utilizes electron scattering in the thin film for the same purpose. This new ultraviolet lithography process avoids the need to handle the thin film until after source metallization has been completed.

U.S. Pat. No. 4,877,480, entitled Lithographic Technique Using Laser for Fabrication of Electronic Components and the Like, issued to Shyam Das on Oct. 31, 1989, teaches a micro-lithographic process of fabricating electronic components, such as, for example, integrated circuit chips and thin film read/write heads for computer disk systems, in which a laser is used to etch features defined by a mask. The laser is selected whose radiation will be absorbed by the workpiece being etched, and the masking material is selected so as to be highly reflective of the laser radiation. The masking material is patterned in a conventional manner so as to expose the portions of the workpiece material to be etched. When the laser is directed to the workpiece, the laser radiation etches the portions of the workpiece not protected by the mask.

U.S. Pat. No. 4,910,123, entitled Pattern Forming Method, issued to Masayuki Endo, Masaru Sasago and Kazufumi Ogawa on Mar. 20, 1990, teaches a pattern forming method using pattern forming material which is reactive to a light of 249 nm or so such as DUV light or excimer laser light and applicable to manufacture of semiconductors.

European Pat. Application No. 87304865.6, entitled Three-Dimensional Modelling Apparatus, filed on Jun. 2, 1987, teaches a modelling apparatus which includes a part generator, a work station and a processing center. The work station and processing center interface with a processor and computer aided design software, such as GEOMED of General Electric/Calma, CADS of Computervision, UNIGRAPHICS of McAuto, MEDUSA of Prime Computer or CIS. In his article entitled "Engineering without Paper," published in High Technology, March 1986, John K. Krouse describes and lists these computer aided design software programs. The workstation and processing center also provide an output to the part generator. The part generator includes a receptacle for the curable liquid, a source of ultra-violet light energy, a beam modulator and deflector. A reservoir supplies the curable liquid through a digitally controlled pump so that the curable liquid continues to lie in a solidification plane within the receptacle. The source of ultra-violet light energy may be either a laser or a strong arc lamp. The beam modulator and deflector receives data in raster forms, vector form or a combination of both. The curable liquid may be any suitable radiation polymerizable liquid which is commonly used in the coating and printing industries. The source of ultra-violet light energy may project an exposure through an erasable mask. The erasable mask may be either a line-by-line exposure using an electro-optical shutter, such as a light switching array, or a frame-by-frame exposure using a light valve in the form of a planar array, such as a liquid crystal display array. Unfortunately there are no light valves suitable for selectively allowing ultra-violet light energy to pass through because the planar array which must record and then erase images will be damaged by ultra-violet light energy which must pass through it in order to be projected onto the curable liquid in the solidification plane. Although line-by-line exposure is much slower than frame-by-frame exposure, the lack of a suitable light valve for ultra-violet light energy inhibits implementation of frame-by-frame frame exposure. The source of ultra-violet light energy may also project an exposure through a segment of a strip of film so that it impinges on the curable liquid in the solidification plane. The configuration of each layer of the plastic part is photographically recorded on one of the film segments. Each film segment has a micropositioning pattern thereon, such as perpendicularly extending Ronchi rulings, to align the layer of the plastic part with its preceding layer. Although the film segments provide frame-by frame exposure and are suitable for ultra-violet light energy the use of the strip film is slower than use of an erasable mask providing frame-by-frame exposure.

U.S. Pat. No. 4,575,330, entitled Apparatus for Production of Three-Dimensional Objects by Stereolithography, issued to Charles W. Hull on Mar. 11, 1986, teaches a stereolithographic system which produces a plastic part from a curable liquid which solidifies when subjected to ultra-violet light energy. The stereolithographic system uses a source of ultra-violet light energy to provide a programmed movable spot of ultra-violet light energy on the surface of the curable liquid. The spot of ultra-violet light energy is moved either using cross-axis galvanometers with attached mirrors or an X-Y arm which moves the source of ultra-violet light energy. Each cross-sectional lamina is solidified on the surface of the curable liquid serially by scanning the spot of ultra-violet light energy directly on the curable liquid. U.S. Pat. No. 4,100,141 teaches a curable liquid which solidifies when subjected to ultra-violet light energy.

In his article entitled "Automatic Method for Fabricating a Three-Dimensional Plastic Model with Photo-hardening Polymer," published in *Review of Scientific Instruments*, Volume 52, Number 11, in Nov. 1981, Hideo Kodama discloses a system which automatically fabricates a plastic part by exposing a liquid photo-hardening polymer to ultra-violet light energy to create a plurality of cross-sectional solidified laminae and serially stacking the cross-sectional solidified laminae to form the plastic part. In his article entitled "Solid Object Generation," published in *Journal of Applied Photographic Engineering*, Volume 8, in 1982, Alan J. Herbert discloses a similar system which only fabricates a plastic part which is a solid of revolution.

U.S. Pat. No. 4,041,476, entitled Method, Medium and Apparatus for Producing Three-Dimensional Figure Product, issued to Wyn Kelly Swainson on Aug. 9, 1977, teaches an apparatus in which a plastic part is formed in situ in a medium having two active components by causing two radiation beams to intersect in the media. The beams trace surface elements of the figure product to be produced.

U.S. Pat. No. 4,078,229, entitled Three Dimensional Systems, issued to Stephen D. Kramer and Wyn K. Swainson on Mar. 7, 1978, teaches a method for producing plastic parts by the intersection of radiation beams.

U.S. Pat. No. 4,238,840, entitled Method, Medium and Apparatus for Producing Three Dimensional Figure Product, issued to Wyn K. Swainson on Dec. 9, 1980, teaches a method for forming a plastic part in situ in a liquid having two active components by causing two radiation beams to intersect in the media. The beams trace surface elements of the plastic part to be produced.

U.S. Pat. No. 4,288,861, entitled Three-Dimensional Systems, issued to Stephen D. Kramer and Wyn K. Swainson on Sept. 8, 1981, teaches a multiple beam absorption effect which creates plastic parts from a liquid medium. Two beams of optical electromagnetic radiation of a spectral characteristic which is matched to the excited state properties of the molecules of the active liquid medium may be either simultaneously or sequentially directed to a common target location to effect a desired photochemical reaction.

U.S. Pat. No. 4,391,499, entitled Image Projector, issued to William C. Whitlock on Jul. 5, 1983, teaches an image projector which creates a three-dimensional image. The image projector includes a plurality of modules which are controllably illuminated to form the desired display. The modules are formed to be illuminated and to pass light from within through their walls and to prevent light from entering their outer walls when the modules are not illuminated.

In an article, entitled Optical Processing with the Ruticon, written by Nicholas K. Sheridon and Michael A. Berkovitz, published in *SPIE*, Volume 83, Optical Information Processing, Ruticons are optically addressed light valves for image storage and optical processing applications. A wide range of image storage times and sensitivities are obtainable depending upon the desired applications.

U.S. Pat. No. 3,716,359, entitled Cyclic Recording System by the Use of an Elastomer in an Electric Field, issued to Nicholas K. Sheridon on Feb. 13, 1973, U.S. Pat. No. 3,842,406, entitled Cyclic Recording System by the Use of an Elastomer in an Electric Field, issued to Nicholas K. Sheridon on Oct. 15, 1974, and U.S. Pat. No. 3,853,614, entitled Cyclic Recording System by the Use of an Elastomer in an Electric Field, issued to Nicholas K. Sheridon on Dec. 10, 1974, teach applications of Ruticons, which are elastomers, to various imaging techniques which may be used for the cyclic recording, storage and subsequent erasure of optical information to form images by the elastic deformation of a thin elastomer layer. The pattern of the surface deformation, in general, follows the light distribution of the optical image being recorded. This image is formed on a photoconductive layer which is adjacent to, or integral with, the elastomer layer. An electric field is placed across the elastomer and the photoconductor layers so that the field is modulated by the action of the image light on the conductivity of the photoconductor to provide the mechanical force necessary to deform the elastomers. Once the elastomer surface has deformed, it will in general remain deformed as long as the field across it is maintained. The image recorded is stored. Removing the electric field allows the elastomer to relax and the image is consequently erased. Reversing the field increases the rate at which the image is erased. A new image may now be formed and the cycle started over again. Such an elastomer material is capable of a great many recording/storage/erasure cycles.

U.S. Pat. No. 4,023,969, entitled Deformable Elastomer Imaging Member Employing an Internal Opaque Deformable Metallic layer, issued to Nicholas K. Sheridon on May 17, 1977, teaches an imaging member of an imaging system which includes a pair of deformable layers and a deformable metallic layer which is arranged between the pair of deformable layers. At least one of the deformable layers includes an elastomer material. In operation an electrical field is established across the deformable layers to cause deformation thereof in imagewise configuration. The imaging member may include photoconductive material and may include a pair of electrodes for establishing an electrical field across the deformable layers. The electrodes include an electrical x-y matrix address system.

U.S. Pat. No. 4,111,538, entitled Projection System of High Frequency, issued to Nicholas K. Sheridon on Sep. 5, 1978, teaches a light system for projection of images onto a visual read out surface such as a screen or photo receptor recording device such as a xerographic drum. The projection system employs a non-point light source which forms a light beam of non-uniform intensity. The light beam is passed through a conical light pipe with a high degree of internal reflection which diffuses the light beam, thereby reducing the non-uniformity of the light beam and also collimates the light beam by internal reflections. The collimated light beam is then modulated with imaging information and is focused onto a visual readout surface such as a screen or a recording device surface.

U.S. Pat. No 3,932,025, entitled Imaging System, issued to Andras I. Lakatos and John B. Flannery on Jan. 13, 1976, teaches an imaging system which forms a plurality of images on the same surface. The imaging system includes an electro-optic imaging member which includes a voltage or current-sensitive light modulating layer, a layer of photoconductive material which exhibits persistent photoconduction properties and a layer of material capable of generating photoinjection currents when struck by radiation which it absorbs.

U.S. Pat. No. 4,099,262, entitled Automatic Memory Control Feedback System for a Cycling Optical Imaging System, issued to Clark I. Bright on Jul. 4, 1978, teaches a system which alters the deformation of a cyclic imaging member. The system includes a deformable member and a circuit. The deformable member has a deformable surface which has been arranged to be placed in an initial deformed position by the application of an input. The circuit is responsive to the extent of the deformation of the deformed surface for altering the deformation of the surface.

U.S. Pat. No 4,44.8,505, entitled Arrangement for Addressing Rays or Planes of Light in Space, issued to Paul DiMatteo on May 15, 1984, teaches an arrangement which projects a sequence of coded patterns onto an object surface and which includes a code generator and a single light source. The code generator has a plurality of addressable light attention regions. The single light source irradiates the code generator. Each region of low attenuation resulting from addressing produces illumination of a corresponding part of the projected coded pattern. The code pattern is projected onto the object surface by passing electromagnetic radiation though the code generator. The purely electrical commands address rays or planes of light in space without the need for mechanically moving parts.

SUMMARY OF THE INVENTION

In view of the foregoing factors and conditions characteristic of the prior art it is the primary object of this invention to provide a system for rapidly producing an integrated circuit on a substrate using a curable liquid which is capable of solidification to form a photo-resist pattern when subjected to ultra-violet light energy.

It is another object of the present invention to provide a system for rapidly producing an integrated circuit on a substrate which includes an erasable mask for reflecting ultra-violet light energy onto a curable liquid by a single frame exposure rather than by either a point-by-point exposure or a line-by-line exposure.

In accordance with an embodiment of the present invention a system for rapidly producing an integrated circuit on a substrate using a curable liquid capable of solidification to form a photo-resist pattern corresponding to an artwork representation of interconnections when subjected to ultra-violet light energy. The system operates with a processor and computer aided design software. The system includes an x-y table, an electronically erasable mask, a drawing device and a projecting system. The substrate is disposed on the x-y table. The curable liquid lies in a solidification plane on the substrate. The electronically erasable mask is an ultra-violet wavelength isolating image buffer and is electrically coupled to the processor. The drawing device may be a back-lighted liquid crystal display or a high resolution cathode ray tube or an infrared diode laser raster scanner and electronically draws an image of the artwork representation for the interconnections onto the electronically erasable mask. The projecting system projects ultra-violet light energy onto the electronically erasable mask so that the electronically erasable mask transfers a single frame exposure of the image in order to reflect the ultra-violet light energy onto the curable liquid in the solidification plane thereby forming the photo-resist pattern on the substrate.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
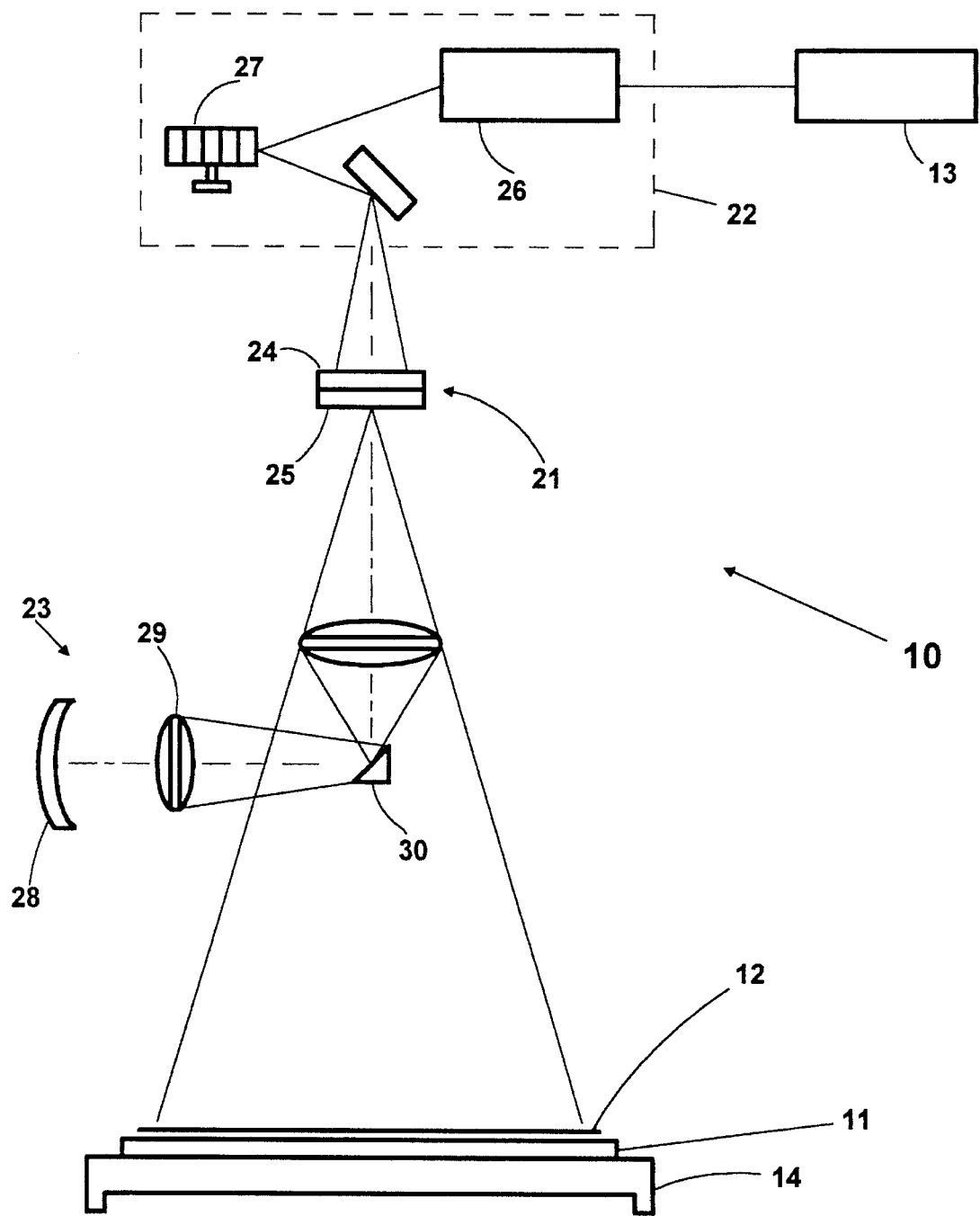
FIG. 1 is a schematic drawing of a processor and a first system for use in rapidly producing an integrated circuit on a substrate using a curable liquid, which is capable of solidification to form a photo-resist pattern when subjected to ultra-violet light energy, which includes an infrared diode laser raster scanner and an erasable mask for reflecting ultra-violet light energy onto the curable liquid by a single frame exposure and which has been constructed in accordance with the principles of the first embodiment of the present invention.

In order to best understand the present invention it is necessary to refer to the following description of its preferred embodiment in conjunction with the accompanying drawing. Referring to FIG. 1 a first system 10 is used to rapidly produce an integrated circuit on a substrate 11 by using a curable liquid 12 which is capable of solidification to form a photo-resist pattern when subjected to ultra-violet light energy. The photo-resist pattern corresponds to an artwork representation of interconnections. The first system 10 operates with a processor 13 and computer aided design software. U.S. Pat. No. 4,100,141 teaches a curable liquid which solidifies when subjected to ultra-violet light energy. European Pat. Application No. 87304865.6 teaches a processor and computer aided design software. The principles of computer generated graphics are combined with the curable liquid 12 to simultaneously execute computer aided design software to form a photo-resist pattern directly from computer instructions. Many of the key elements of the first system 10 are the same as those elements which U.S. Pat. No 4,575,330 describes. The processor 13 is used to generate the sequence of a two-dimensional image of individual artwork representation of interconnections on the substrate 11. The two-dimensional image is read out of the processor 13 into any of several image generation devices such as a back-lighted liquid crystal display or cathode ray tube or an infrared diode laser raster scanner or a visible laser raster scanner or a vector scanner. The first system 10 includes an x-y table 14. The substrate 11 is disposed on the x-y table 14. The curable liquid 12 lies in a solidification plane 15 on the substrate 11.

Figure 2:
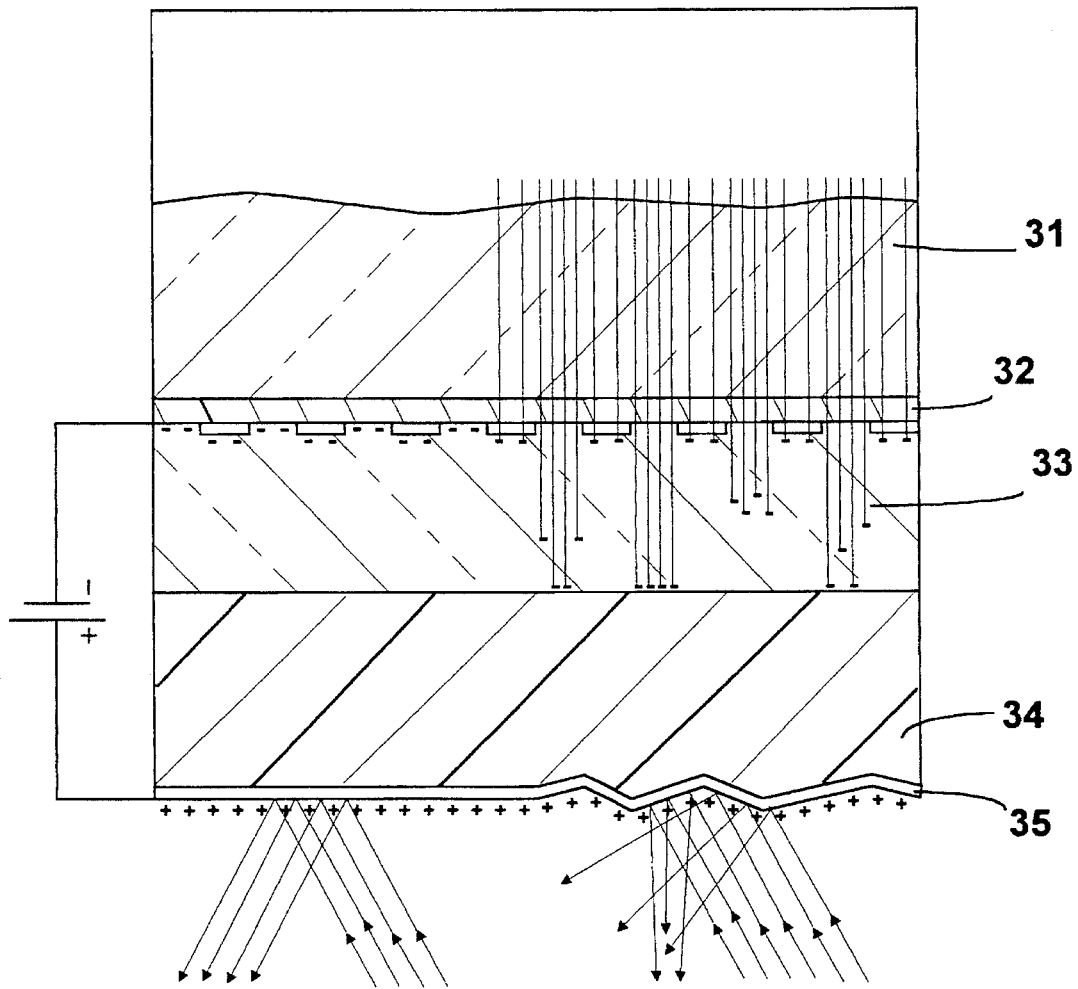
FIG. 2 is a cross-sectional view of the erasable mask of FIG. 1.

Referring to FIG. 1 in conjunction with FIG. 2 the first system 10 includes a first optical system 20 which transfers the image which is stored in the ultra-violet wavelength isolating image buffer onto the solidification plane 15 of the curable liquid 11. The first optical system 20 includes an electronically erasable mask 21, a first drawing device 22 and a projecting system 23 all of which are electrically coupled to the processor 12. The electronically erasable mask 21 is an ultra-violet wavelength isolating image buffer which has an input surface 24 and an output surface 25 and which is often referred to as a Ruticon. The first drawing device 22 is a combination of an infrared diode laser 26 and a laser raster scanner 27 and electronically draws an image of the artwork representation for the interconnections onto the electronically erasable mask 21. The first projecting system 23 includes a compact arc lamp 28, either mercury vapor or mercury/xenon, a condenser lens 29 and a shutter 30. The condenser lens 29 collects and collimates the ultra-violet light energy from the compact arc lamp 28 in order to direct the ultra-violet light energy to the output surface 25 of the ultra-violet wavelength isolating image buffer. The shutter 30 is controlled by the processor 12 and is used to select the exposure time required to form a solidified image on surface of the curable liquid 11. When no image is stored in the ultra-violet wavelength isolating image buffer the ultra-violet light energy from the arc lamp 50 is focused on a zero order stop. The projecting system 23 generates ultra-violet light energy which is collimated and directed onto the output surface 25 of the ultra-violet wavelength isolating image buffer. The optical system 20 is a Schlieren type system and blocks light which is reflected from non-wrinkled portions of the output surface 25, or portions thereof which contain no image information. The optical system 20 also includes an imaging lens 28 which forms an image of the output surface 25 on the surface of the curable liquid 12 in the solidification plane 16 and which also forms a focus for non-diffracted light at a zero order stop. When the output surface 25 of the ultra-violet wavelength isolating image buffer contains no image information, all of the ultra-violet light energy is focused on the zero order stop, and none of the ultra-violet light energy is imaged onto the curable liquid 12. When image information is present on the output surface 25 of the ultra-violet wavelength isolating image buffer, the output surface 25 of the ultra-violet wavelength isolating image buffer diffracts the ultra-violet light energy incident on the image carrying portions of the output surface 25 and causes this light to diffract around the zero order stop and form an ultra-violet image on the surface of the curable liquid 12 so that the electronically erasable mask 21 transfers a single frame exposure of the image in order to reflect the ultra-violet light energy onto the curable liquid 12 in the solidification plane 16 thereby forming the photo-resist pattern on the substrate. In another embodiment the projecting system 23 may be a laser system.

The ultra-violet wavelength isolating image buffer has properties which are ideal for this application and can be constructed to allow two-dimensional information to be optically addressed on its input surface. The ultra-violet wavelength isolating image buffer is a laminated structure which includes a transparent glass substrate 31, a transparent coating 32, a photoconductive coating 33, an elastomer layer 34 and a conductive reflective layer 35. The transparent glass substrate 31 is used as its base of a Ronchi ruling formed onto the inner side of the laminated structure. The transparent conductive coating 32 is formed over the ruled glass substrate 31 to form a transparent electrode. Over the ruled glass substrate 31 and the conductive coating 32 is the photoconductive coating 33 which forms its optically addressable portion. This photoconductive coating 33 can be any of several types including PVK-TNF, amorphous silicon or selenium, depending of the type of light source to be used to optically address the ultra-violet wavelength isolating image buffer. Over the photoconductor 33 is the elastomer layer 34 which is a deformable material. And finally the last layer is the conductive reflective layer 35. This conductive reflective layer 35 is typically a thin metal layer. When an image is formed on the photoconductive coating 33 using the first drawing device 22 an electrical charge distribution is created corresponding to the image. Corresponding to the electrical charge distribution the conductive reflective layer 32 on the output surface 25 of the ultra-violet wavelength isolating image buffer is distorted into "wrinkles" or waves. These waves form a diffraction grating wherever the image information is present. U.S. Pat. No. 3,932,025 described the ultra-violet wavelength isolating image buffer and teaches the details of the function and operation of the ultra-violet wavelength isolating image buffer.

Figure 3:
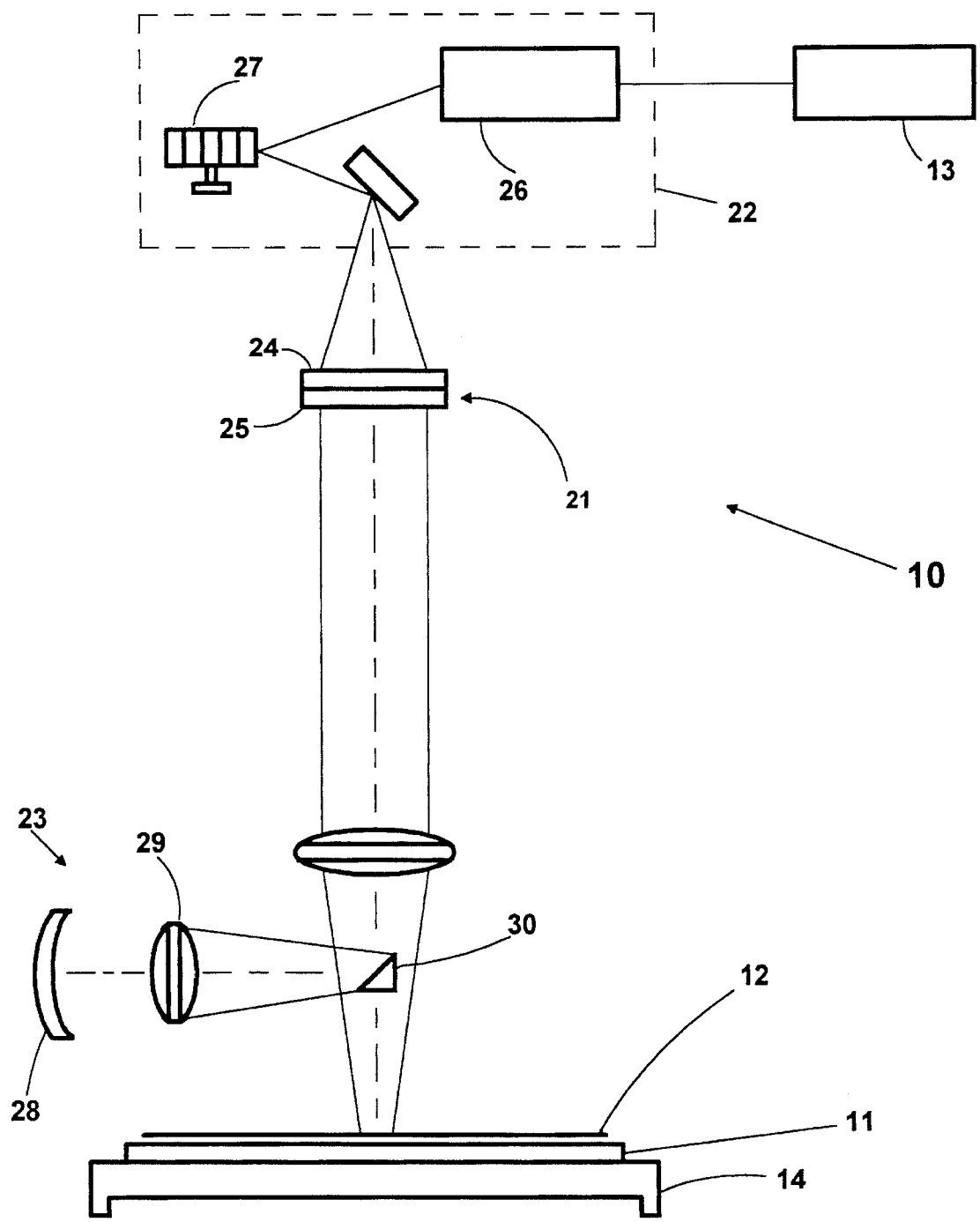
FIG. 3 is a schematic drawing of a processor and the first system of FIG. 1 which rapidly produces interconnections on a printed circuit board.

The advantages of the ultra-violet wavelength isolating image buffer as an image buffer device is that the photoconductive surface 32 of the image buffer is optically isolated from the ultra-violet light energy. Therefore the photoconductive surface 32 which receives the optical image information on the input side of the ultra-violet wavelength isolating image buffer is neither damaged nor saturated by ultra-violet light energy of an intensity which is present on its output surface 25. Other image buffer devices such as a liquid crystal display which is used as a light valve do not have such optical isolation of input and output and are damaged by the presence of ultra-violet light energy and can therefore can not be used for this type of application.

referring to FIG. 3 the first system 10 may be used to rapidly produce interconnections on a printed circuit board 60 by using a curable liquid 12 which is capable of solidification to form a photo-resist pattern when subjected to ultra-violet light energy. The photo-resist pattern corresponds to an artwork representation of interconnections. The first system 10 also operates with the processor 13 and computer aided design software.

Figure 4:
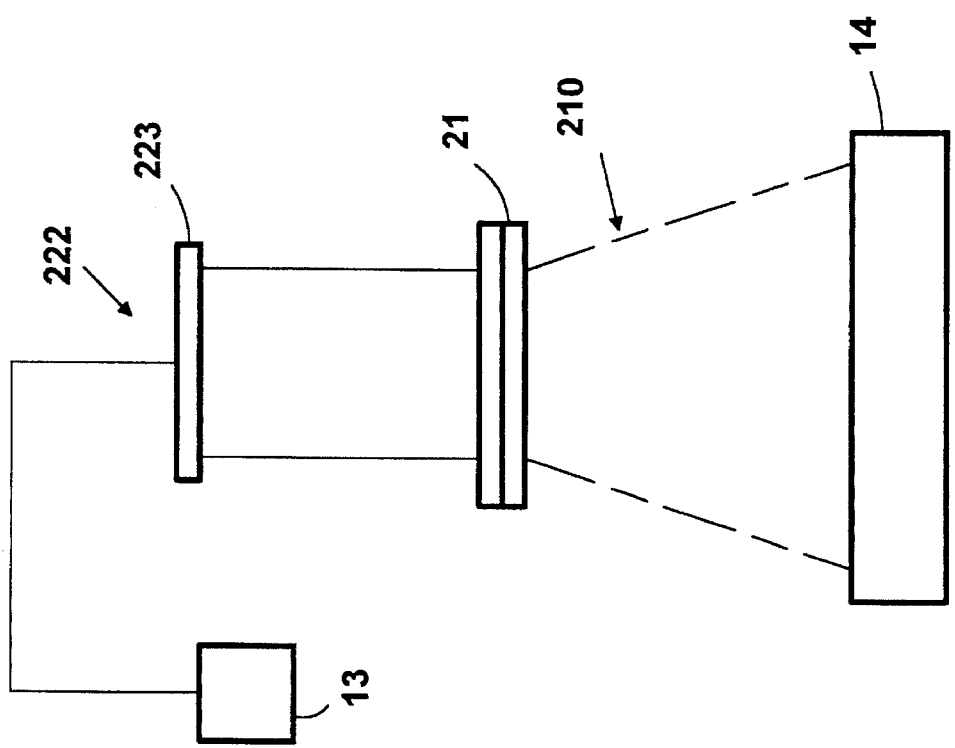
FIG. 4 is a partial schematic drawing of a second system for rapidly producing either an integrated circuit on a substrate or interconnections on a printed circuit board a plastic part from a curable liquid which solidifies when subjected to ultra-violet light energy which includes a high resolution cathode ray tube and an erasable mask for reflecting ultra-violet light energy onto the curable liquid by a single frame exposure and which has been constructed in accordance with the principles of the second embodiment of the present invention.

Referring to FIG. 4 in conjunction with FIG. 1 and FIG. 2 the second system 110 may include a second optical system 120 which transfers the image which is stored in the ultra-violet wavelength isolating image buffer onto the solidification plane 15 on either the substrate 11 or the printed circuit board 60. The second optical system 120 includes the electronically erasable mask 21, a second drawing device 122 and the projecting system 23 all of which are electrically coupled to the processor 13. The second drawing device 122 is a cathode ray tube 123 which optically addresses the ultra-violet wavelength isolating image buffer. The cathode ray tube 123 would be a standard monochrome high resolution the cathode ray tube. A computer generated image of a two-dimensional image of individual artwork representation of interconnections on either the substrate 11 or the printed circuit board 60 is formed in the processor 13 and read out of the processor 13 in serial fashion onto the cathode ray tube 123. Other image input systems could be a laser vector scanner and a helium-neon laser with an acousto-optic light modulator.

Figure 5:
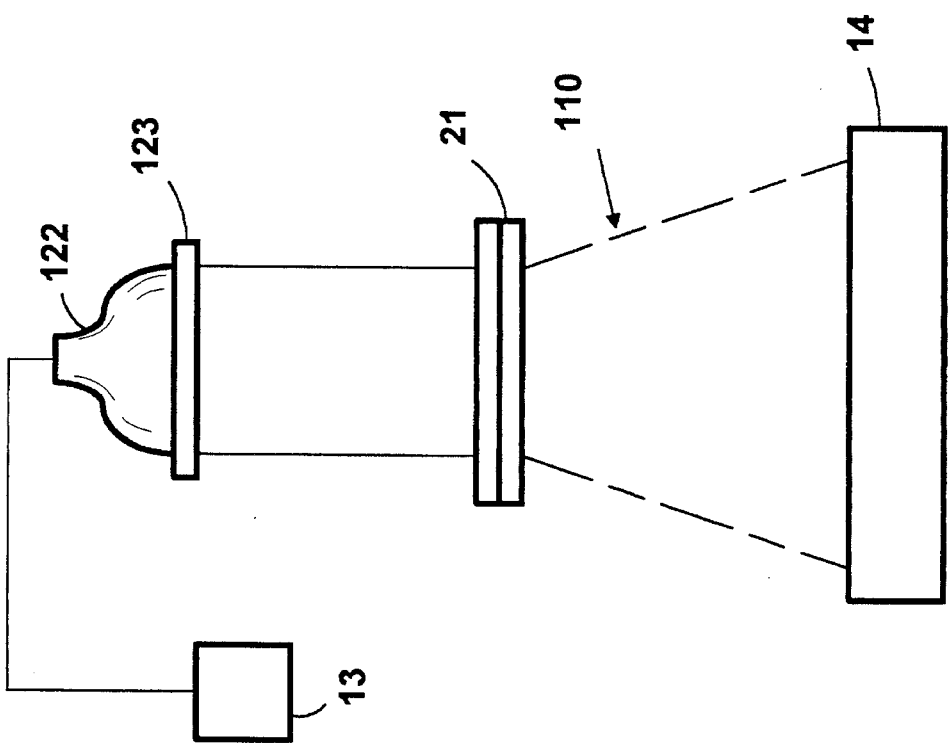
FIG. 5 is a partial schematic drawing of a third system for rapidly producing either an integrated circuit on a substrate or interconnections on a printed circuit board a plastic part from a curable liquid which solidifies when subjected to ultra-violet light energy which includes a back-lighted liquid crystal display and an erasable mask for reflecting ultra-violet light energy onto the curable liquid by a single frame exposure and which has been constructed in accordance with the principles of the third embodiment of the present invention.

Referring to FIG. 5 in conjunction with FIG. 1 and FIG. 2 the second system 210 may include a second optical system 220 which transfers the image which is stored in the ultra-violet wavelength isolating image buffer onto the solidification plane 15 on either the substrate 11 or the printed circuit board 60. The second optical system 220 includes the electronically erasable mask 21, a second drawing device 222 and the projecting system 23 all of which are electrically coupled to the processor 13. The second drawing device 222 is a back-lighted liquid crystal display 223 which optically addresses the ultra-violet wavelength isolating image buffer. A computer generated image of a two-dimensional image of individual artwork representation of interconnections on either the substrate 11 or the printed circuit board 60 is formed in the processor 13 and read out of the processor 13 in serial fashion into the back-lighted liquid crystal display 222. The image of the back-lighted liquid crystal display 222 is formed on the input surface 24, which is photoconductive, of the ultra-violet wavelength isolating image buffer. This image is stored in the ultra-violet wavelength isolating image buffer. The second optical 220 is used to transfer an image from the output surface 25 of the ultra-violet wavelength isolating image buffer onto the surface of the curable liquid 11. The image stored in the ultra-violet wavelength isolating image buffer is of one two-dimensional lamina cross-section to be solidified on the surface of the curable liquid 11. Any one of these image generation devices is used to optically address the ultra-violet wavelength isolating image buffer which stores the image for later full frame imaging onto the surface of the curable liquid 11. When an image is present in the ultra-violet wavelength isolating image buffer, an ultraviolet image is formed on the surface of the curable liquid 12 which causes the image to solidify on its surface.

From the foregoing it can be seen that a system for rapidly producing either an integrated circuit on a substrate or interconnections on a printed circuit board has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A system for rapidly producing an integrated circuit on a substrate using a curable liquid capable of solidification to form a photo-resist pattern corresponding to an artwork representation of interconnections when subjected to ultraviolet light energy in combination with a processor and computer aided design software, said system comprising:

a. an x-y table on which the substrate is positioned, the curable liquid which lies in a solidification plane on the substrate;

b. an electronically erasable mask which is an ultraviolet wavelength isolating image buffer and which is electrically coupled to the processor;

c. optical drawing means for optically drawing an image of the artwork representation for the interconnection onto said electronically erasable mask using light of a wavelength range having wavelengths longer than ultraviolet light, said drawing means being electrically coupled to the processor; and d. projecting means for projecting ultra-violet light energy onto said electronically erasable mask so that said electronically erasable mask transfers a single frame exposure of said image in order to reflect said ultraviolet light energy onto the curable liquid in said solidification plane thereby forming the photo-resist pattern on the substrate.

2. A system for rapidly producing an integrated circuit on a substrate according to claim 1 wherein said drawing means comprises an infrared diode laser raster scanner.

3. A system for rapidly producing an integrated circuit on a substrate according to claim 1 wherein said drawing means comprises a high resolution cathode ray tube.

4. A system for rapidly producing an integrated circuit on a substrate according to claim 1 wherein said drawing means comprises a back-lighted liquid crystal display.

5. A system for rapidly producing an integrated circuit on a substrate according to claim 1 wherein said drawing means comprises a helium-neon laser with an acousto-optic modulator.

6. A system for rapidly producing interconnections on a printed circuit board using a curable liquid capable of solidification to form photoresist pattern corresponding to an artwork representation of interconnections when subjected to ultraviolet light energy in combination with a processor and computer aided design software, said system comprising:

a. an x-y table on which the printed circuit board is positioned, the curable liquid which lies in a solidification plane on the printed circuit board;
   b. an electronically erasable mask which is an ultraviolet wavelength isolating image buffer and which is electrically coupled to the processor;
   c. optical drawing means for optically drawing an image of the artwork representation for the interconnection onto said electronically erasable mask using light of a wavelength range having wavelengths longer than ultraviolet light, said drawing means being electrically coupled to the processor; and
   d. projecting means for projecting ultraviolet light energy onto said electronically erasable mask so that said electronically erasable mask transfers a single frame exposure of said image in order to reflect said ultraviolet light energy onto the curable liquid in said solidification plane thereby forming the photoresist pattern on the printed circuit board.

7. A system for rapidly producing interconnections on a printed circuit board according to claim wherein said drawing means comprises an infrared diode laser raster scanner.

8. A system for rapidly producing interconnections on a printed circuit board according to claim 6 wherein said drawing means comprises a high resolution cathode ray tube.

9. A system for rapidly producing interconnections on a printed circuit board according to claim 6 wherein said drawing means comprises a back-lighted liquid crystal display.

10. A system for rapidly producing interconnections on a printed circuit board according to claim 6 wherein said drawing means comprises a helium-neon laser with an acousto-optic modulator.

11. A system for rapidly producing a circuit pattern on a substrate, said system comprising:

a pattern generating computer that converts an image of a pattern to be written into information representative of a pattern to be written;

a first light source emitting light in a first wavelength range, said first light source coupled to said pattern generating computer so that said first light source is modulated with said information representative of a pattern to be written, said first wavelength range comprising wavelengths longer than ultraviolet light;

an electronically erasable mask in which information representative of a pattern to be written can be optically written and stored, said electronically erasable mask positioned to receive light emitted by said first light source, said electronically erasable mask absorbing radiation within said first wavelength range and forming within said electronically erasable mask an optically readable image that corresponds to said information representative of a pattern to be written, whereby said electronically erasable mask acts as an ultraviolet wavelength isolating image buffer;

a second light source emitting ultraviolet light, said second light source directing said ultraviolet light onto said optically readable image within said electronically erasable mask so that said ultraviolet light is modulated with a pattern corresponding to said optically readable image; and a substrate positioned so that said modulated ultraviolet light is incident on said substrate so that a photosensitive medium positioned on the surface of said substrate is exposed in accordance with said modulated ultraviolet light pattern.

12. The system of claim 11 wherein said first light source comprises an infrared diode laser raster scanner.

13. The system of claim 11 wherein said first light source comprises a visible laser and an accousto-optical modulator.

14. The system of claim 11, wherein said electronically erasable mask stores a frame of information that represents a portion of a total circuit pattern to be formed, the system further comprising a translation table on which said substrate is mounted and means for translating said translation table so that adjacent frames of information can be projected onto said substrate.

15. The system of claim 11 wherein said electronically erasable mask is coupled to said pattern generating computer so that said electronically erasable mask can be erased after said optically readable image has been read out.

* * * * *